United States Patent [19]
Doing et al.

[11] Patent Number: 6,161,166
[45] Date of Patent: Dec. 12, 2000

[54] INSTRUCTION CACHE FOR MULTITHREADED PROCESSOR

[75] Inventors: Richard William Doing, Rochester; Ronald Nick Kalla, Zumbro Falls; Stephen Joseph Schwinn, Lakeville, all of Minn.

[73] Assignee: International Business Machines Corporation, Armonk, N.Y.

[21] Appl. No.: 09/266,133

[22] Filed: Mar. 10, 1999

Related U.S. Application Data

[63] Continuation-in-part of application No. 08/966,706, Nov. 10, 1997.

[51] Int. Cl.[7] .................................................. G06F 12/08
[52] U.S. Cl. ........................ 711/125; 711/128; 711/129; 711/130; 711/131; 711/137; 711/207; 709/104; 709/107; 712/205; 712/206; 712/207; 712/212; 712/228; 712/246
[58] Field of Search ................................... 711/125, 141, 711/207, 128, 129, 130, 131, 137; 709/107, 104; 712/228, 206, 205, 207, 212, 246

[56] References Cited

U.S. PATENT DOCUMENTS

| 5,835,705 | 11/1998 | Larsen et al. | 714/47 |
|---|---|---|---|
| 5,875,461 | 2/1999 | Lindholm | 711/118 |
| 5,909,695 | 6/1999 | Wong et al. | 711/133 |
| 5,933,627 | 11/1999 | Parady et al. | 712/228 |
| 5,944,816 | 8/1999 | Dutton et al. | 712/215 |
| 5,978,838 | 11/1999 | Mohamed et al. | 709/208 |
| 6,038,647 | 3/2000 | Shimizu | 711/168 |

OTHER PUBLICATIONS

The Cache Memory Book, Handy J., ISBN 0–12–322985–5, 1993, pp. 47–60.
Levitan, David et al, "The PowerPC 620™ Microprocessor: A High Performance Superscalar RISC Microprocessor" IEEE Proceedings of Computer 1995, pp. 285–291.

*Primary Examiner*—Hiep T. Nguyen
*Attorney, Agent, or Firm*—Roy W. Truelson

[57] ABSTRACT

A multithreaded processor includes a level one instruction cache shared by all threads. The I-cache is accessed with an instruction unit generated effective address, the I-cache directory containing real page numbers of the corresponding cache lines. A separate line fill sequencer exists for each thread. Preferably, the I-cache is N-way set associative, where N is the number of threads, and includes an effective-to-real address table (ERAT), containing pairs of effective and real page numbers. ERAT entries are accessed by hashing the effective address. The ERAT entry is then compared with the effective address of the desired instruction to verify an ERAT hit. The corresponding real page number is compared with a real page number in the directory array to verify a cache hit. Preferably, the line fill sequencer operates in response to a cache miss, where there is an ERAT hit. In this case, the full real address of the desired instruction can be constructed from the effective address and the ERAT, making it unnecessary to access slower address translation mechanisms for main memory. Because there is a separate line fill sequencer for each thread, threads are independently able to satisfy cache fill requests without waiting for each other. Additionally, because the I-cache index contains real page numbers, cache coherency is simplified. Furthermore, the ERAT avoids the need in many cases to access slower memory translation mechanisms. Finally, the n-way associative nature of the cache reduces thread contention.

20 Claims, 11 Drawing Sheets

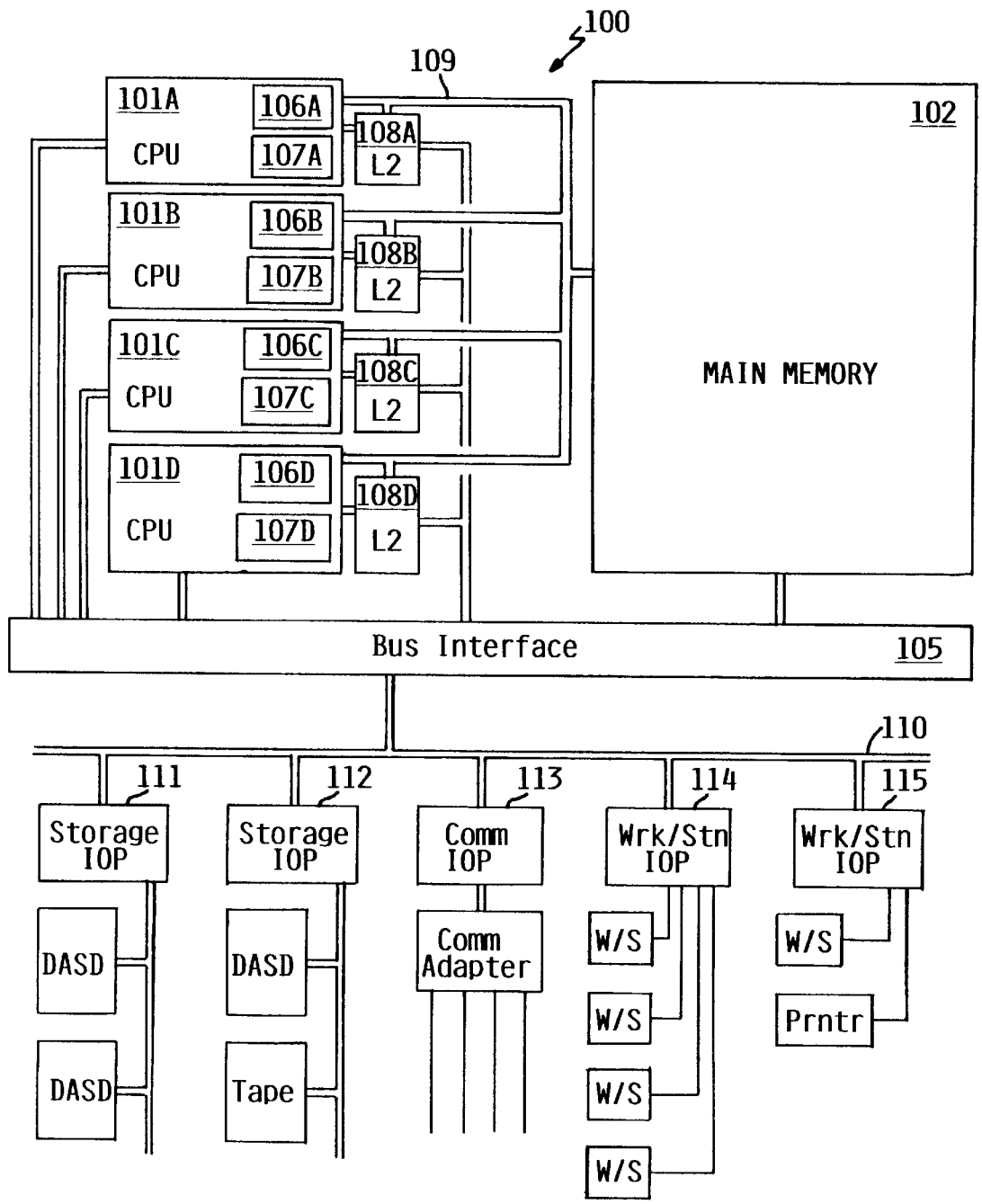
FIG. IB

INSTRUCTION CACHE FOR MULTITHREADED PROCESSOR

RELATED APPLICATIONS

The present application is a continuation-in-part of commonly assigned co-pending U.S. patent application Ser. No. 08/966,706, filed Nov. 10, 1997, entitled Effective-To-Real Address Cache Managing Apparatus and Method which is herein incorporated by reference.

The present application is also related to the following commonly assigned co-pending U.S. patent applications, all of which are herein incorporated by reference:

Ser. No. 08/976,533, filed Nov. 21, 1997, entitled Accessing Data from a Multiple Entry Fully Associative Cache Buffer in a Multithread Data Processing System.

Ser. No. 08/958,718, filed Oct. 23, 1997, entitled Altering Thread Priorities in a Multithreaded Processor.

Ser. No. 08/958,716, filed Oct. 23, 1997, entitled Method and Apparatus for Selecting Thread Switch Events in a Multithreaded Processor.

Ser. No. 08/957,002, filed Oct. 23, 1997, entitled Thread Switch Control in a Multithreaded Processor System.

Ser. No. 08/956,875, filed Oct. 23, 1997 entitled An Apparatus and Method to Guarantee Forward Progress in a Multithreaded Processor.

Ser. No. 08/956,577, filed Oct. 23, 1997, entitled Method and Apparatus To Force a Thread Switch in a Multithreaded Processor.

Ser. No. 08/773,572, filed Dec. 27, 1996, entitled Background Completion of Instruction and Associated Fetch Request in a Multithread Processor.

FIELD OF THE INVENTION

The present invention relates generally to digital data processing, and more particularly to instruction caches used to provide instructions to the processing unit of a digital computer system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple processors. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

In order to boost CPU speed, it is common in high performance processor designs to employ instruction pipelining, as well as one or more levels of cache memory. Pipeline instruction execution allows subsequent instructions to begin execution before previously issued instructions have finished. Cache memories store frequently used and other data nearer the processor and allow instruction execution to continue, in most cases, without waiting the full access time of a main memory.

Pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses.

It can be seen that the reduction of time the processor spends waiting for some event, such as re-filling a pipeline or retrieving data from memory, will increase the average number of operations per clock cycle. One architectural innovation directed to this problem is called "multithreading". This technique involves breaking the workload into multiple independently executable sequences of instructions, called threads. At any instant in time, the CPU maintains the state of multiple threads. As a result, it is relatively simple and fast to switch threads.

The term "multithreading" as defined in the computer architecture community is not the same as the software use of the term which means one task subdivided into multiple related threads. In the architecture definition, the threads may be independent. Therefore "hardware multithreading" is often used to distinguish the two uses of the term. As used herein, "multithreading" will refer to hardware multithreading.

There are two basic forms of multithreading. In the more traditional form, sometimes called "fine-grained multithreading", the processor executes N threads concurrently by interleaving execution on a cycle-by-cycle basis. This creates a gap between the execution of each instruction within a single thread, which removes the need for the processor to wait for certain short term latency events, such as re-filling an instruction pipeline. In the second form of multithreading, sometimes called "coarse-grained multithreading", multiple instructions in a single thread are sequentially executed until the processor encounters some longer term latency event, such as a cache miss.

Typically, multithreading involves replicating the processor registers for each thread in order to maintain the state of multiple threads. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated.

Usually, some of the larger hardware structures such as level one instruction cache, level one data cache, functional or execution units, etc., are not replicated. All other things being equal, there may be some incremental performance benefit in replicating the larger hardware structures. However, any such approach requires a trade-off of this incremental benefit against the additional hardware required. Caches consume considerable area on a processor chip, which could be devoted to other uses. Therefore, the size of the caches, and number and function of caches, must be chosen carefully.

For a high performance design, a level one instruction cache (L1 I-cache) is often incorporated on the processor chip. The L1 I-cache is intended to hold instructions considered likely to be executed in the immediate future.

Where an L1 I-cache is used in a multithreaded processor, some additional concerns arise. The I-cache should be able to support rapid thread switching, without undue contention between threads. One way to avoid contention is to have a separate I-cache for each thread, but this consumes valuable hardware or makes the individual cache for a single thread unduly small. It would be preferable that all threads share a single L1 I-cache, without undue contention among threads. It would also be desirable that the cache accessing mechanism avoid the use of slow address translation mechanisms where possible.

Design of the L1 I-cache is crucial to high-speed processor operation. If the I-cache miss rate is high, or access time is too slow, or there is excessive contention among different threads, or cache coherency is difficult to maintain, the processor will spend undue time waiting for the next instruction to be executed. Continued improvement of processors requires that the L1 I-cache efficiently address these concerns, particularly in a multithreading environment.

SUMMARY OF THE INVENTION

It is therefore an object of the present invention to provide an improved processor apparatus.

Another object of this invention is to provide an improved instruction caching apparatus for a multithreaded processor.

Another object of this invention is to reduce the contention among threads in a multithreaded processor when accessing an instruction cache.

A multithreaded processor includes a level one instruction cache shared by all threads. The L1 I-cache comprises a directory array and an array of cached instructions, both of which are shared by all threads, and are accessed by constructing a hash function from the effective address of the desired instruction. Each directory array entry contains at least a part of the real address of the corresponding cache line in the array of cached instructions, from which it is possible to derive a complete real address of an instruction in the cache. A separate line fill sequencer exists for each thread, making it possible to satisfy cache line fill requests for one thread while another thread is accessing cache entries, or to prefetch lines for an executing thread.

In the preferred embodiment, these arrays are divided into multiple sets, each set having one entry corresponding to each respective hash function value (an N-way associative cache). In this embodiment, the processor maintains state information for two separate threads, and the instruction cache arrays are divided into two sets, although different numbers of threads and cache associativity may be used. Contention among different threads is reduced because each thread can independently access different cached instructions having the same hash value, but belonging to different sets.

Preferably, the I-cache includes an effective-to-real address table (ERAT), which functions as a cache of the address translation table for main memory. The ERAT contains pairs of effective and corresponding real address portions. ERAT entries are accessed with a hash function of the effective address of a desired instruction. The effective address portion in the ERAT entry is then compared with the effective address of the desired instruction to verify an ERAT hit. The corresponding real address portion is compared with a portion of real address in the directory array to verify a cache hit.

Preferably, the line fill sequencer operates in response to a cache miss, where an ERAT entry exists for the requested effective address (an ERAT hit). In this case, the full real address of the desired instruction can be constructed from the effective address and information in the ERAT, making it unnecessary to access slower address translation mechanisms for main memory. The line fill sequencer directly accesses memory using the constructed real address.

Because there is a separate line fill sequencer for each thread, threads are independently able to satisfy cache fill requests without waiting for each other. Additionally, because the I-cache index contains a real page number corresponding to an entry, cache coherency is simplified. Furthermore, the use of an ERAT to correlate effective and real page numbers avoids the need in many cases to access slower memory translation mechanisms. Finally, the n-way associative nature of the cache allows all threads to use a common cache without undue thread contention.

Other objects, features and characteristics of the present invention; methods, operation, and functions of the related elements of the structure; combination of parts; and the like will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIG. 1B is a high-level block diagram of the major hardware components of a computer system having multiple CPUs, according to the preferred embodiment of the invention described herein.

DETAILED DESCRIPTION OF THE PREFERRED EMBODIMENT

Figure 1A:
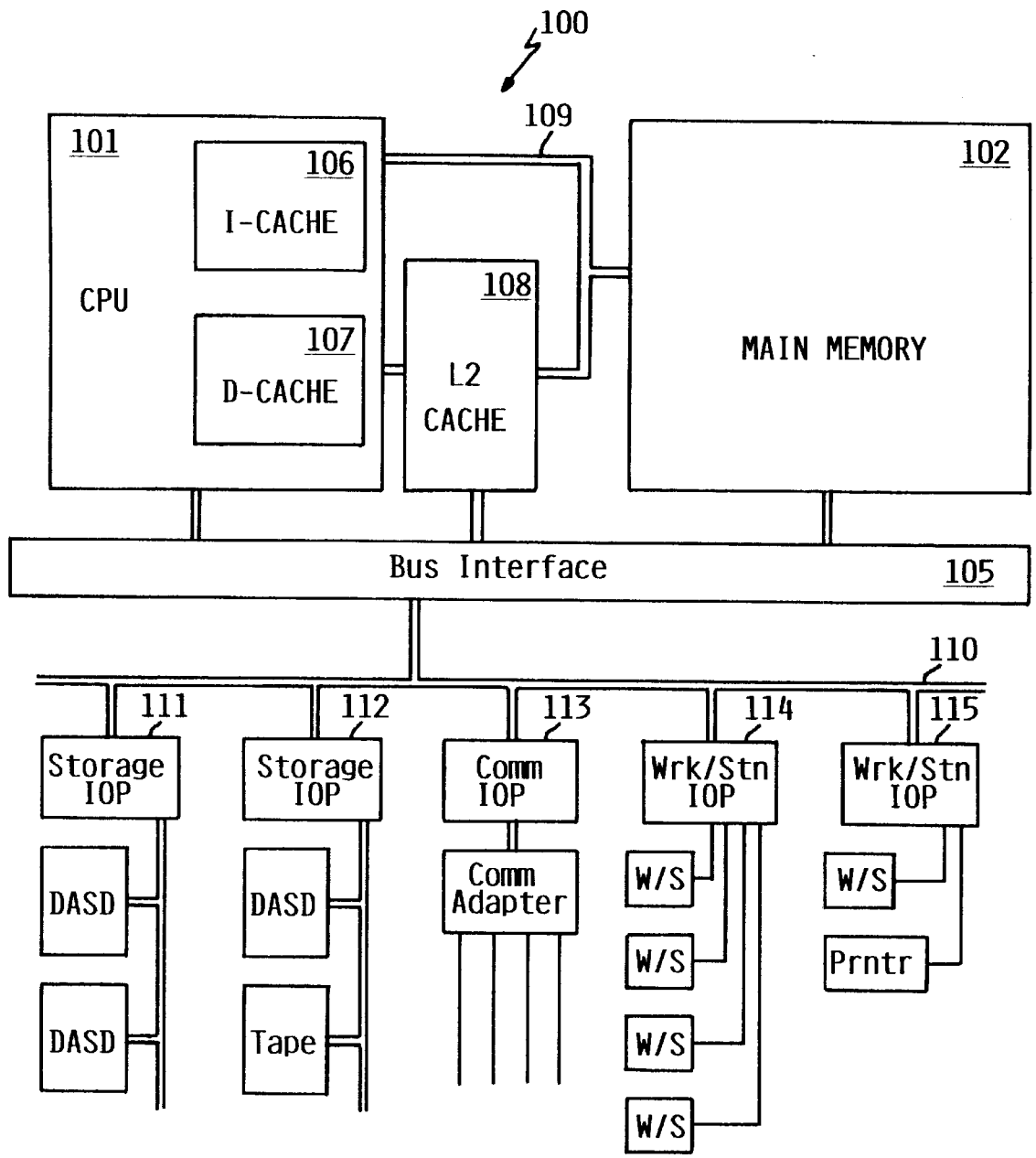
FIG. 1A is a high-level block diagram of the major hardware components of a computer system having a single CPU, according to the preferred embodiment of the invention described herein.

The major hardware components of a single-CPU computer system 100 for utilizing the instruction cache architecture according to the preferred embodiment of the present invention are shown in FIG. 1A. CPU 101 for processing instructions contains separate internal level one instruction cache 106 (L1 I-cache) and level one data cache 107 (L1 D-cache). L1 I-cache 106 stores instructions for execution by CPU 101. L1 D-cache stores data (other than instructions) to by processed by CPU 101. CPU 101 is coupled to level two cache (L2 cache) 108, which can be used to hold both instructions and data. Memory bus 109 transfers data between L2 cache 108 or CPU 101 on the one hand and main memory 102 on the other. CPU 101, L2 cache 108 and main memory 102 also communicate via bus interface 105 with system bus 110. Various I/O processing units (IOPs) 111–115 attach to system bus 110 and support communication with a variety of storage and I/O devices, such as direct access storage devices (DASD), tape drives, workstations, printers, and remote communication lines for communicating with remote devices or other computer systems.

In should be understood that FIG. 1A is intended to depict the representative major components of system 100 at a high level, and that the number and types of such components may vary. In particular, system 100 may contain multiple CPUs. Such a multiple CPU system is depicted in FIG. 1B. FIG. 1B shows a system having four CPUs 101A, 101B, 101C, 101D, each CPU having respective L1 I-cache 106A, 106B, 106C, 106D and respective L1 D-cache 107A, 107B, 107C, 107D. A separate L2 cache 108A, 108B, 108C, 108D is associated with each CPU.

In the preferred embodiment, each CPU is capable of maintaining the state of two threads, and switches execution between threads on certain latency events. I.e., CPU executes a single thread (the active thread) until some latency event is encountered which would force the CPU to wait, (a form of coarse-grained multithreading). However, it should be understood that the present invention could be practiced with a different number of thread states in each CPU, and that it would be possible to interleave execution of instructions from each thread on a cycle-by-cycle basis (fine-grained multithreading), or to switch threads on some different basis.

Figure 2:
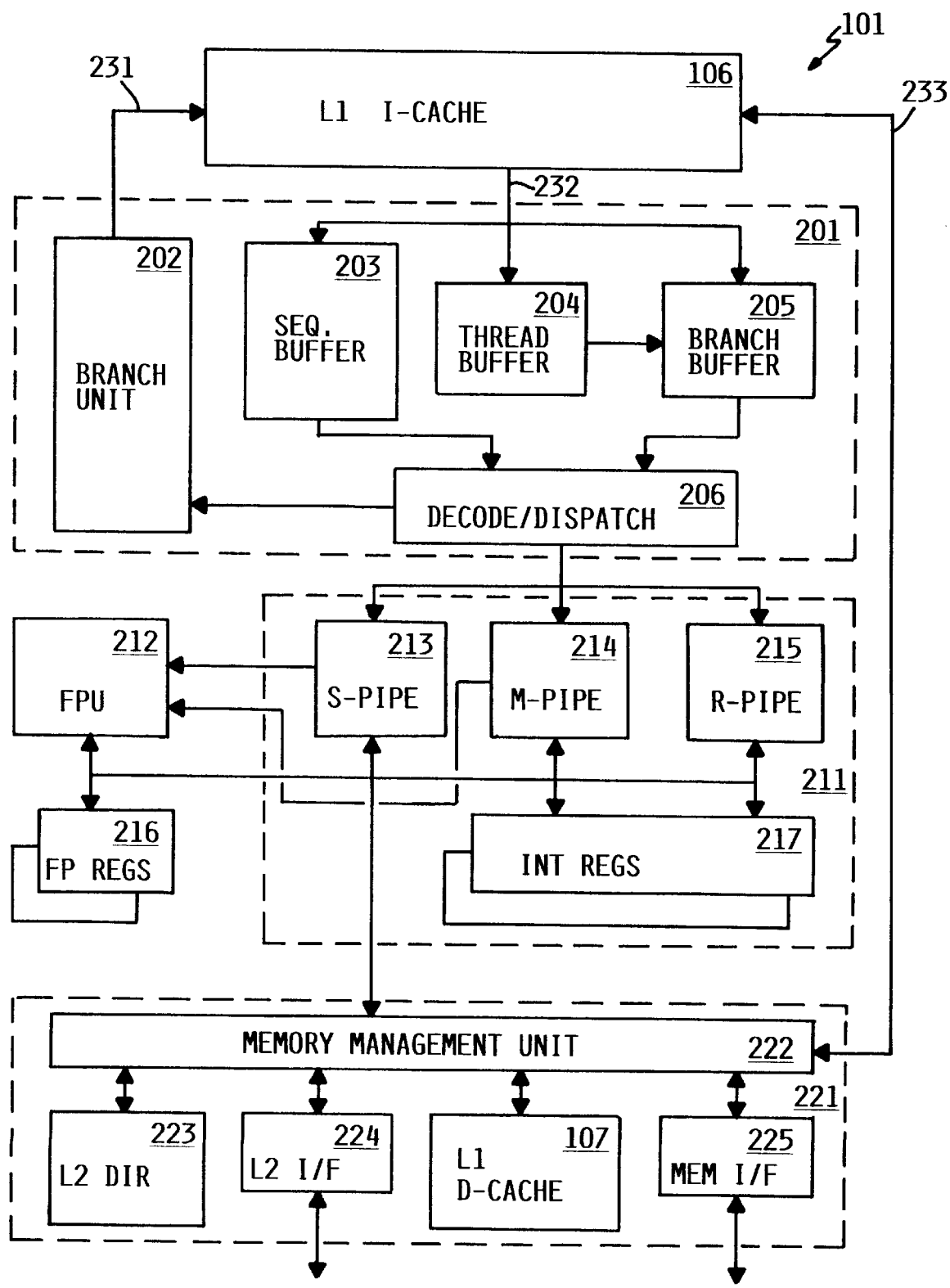
FIG. 2 is a high-level diagram of a central processing unit of a computer system according to the preferred embodiment.

FIG. 2 is a high level diagram of the major components of CPU 101, showing CPU 101 in greater detail than is depicted in FIGS. 1A and 1B, according to the preferred embodiment. In this embodiment, the components shown in FIG. 2 are packaged on a single semiconductor chip. CPU 101 includes instruction unit portion 201, execution unit portion 211, and storage control portion 221. In general, instruction unit 201 obtains instructions from L1 I-cache 106, decodes instructions to determine operations to perform, and resolves branch conditions to control program flow. Execution unit 211 performs arithmetic and logical operations on data in registers, and loads or stores data. Storage control unit 221 accesses data in the L1 data cache or interfaces with memory external to the CPU where instructions or data must be fetched or stored.

Instruction unit 201 comprises branch unit 202, buffers 203, 204, 205, and decode/dispatch unit 206. Instructions from L1 I-cache 106 are loaded into one of the three buffers from L1 I-Cache instruction bus 232. Sequential buffer 203 stores 16 instructions in the current execution sequence. Branch buffer 205 stores 8 instructions from a branch destination; these are speculatively loaded into buffer 205 before branch evaluation, in the event the branch is taken. Thread switch buffer 204 stores 8 instructions for the inactive thread; in the event a thread switch is required from the currently active to the inactive thread, these instructions will be immediately available. Decode/dispatch unit 206 receives the current instruction to be executed from one of the buffers, and decodes the instruction to determine the operation(s) to be performed or branch conditions. Branch unit 202 controls the program flow by evaluating branch conditions, and refills buffers from L1 I-cache 106 by sending an effective address of a desired instruction on L1 I-Cache address bus 231.

Execution unit 211 comprises S-pipe 213, M-pipe 214, R-pipe 215 and a bank of general purpose registers 217.

Registers 217 are divided into two sets, one for each thread. R-pipe is a pipelined arithmetic unit for performing a subset of integer arithmetic and logic functions for simple integers. M-pipe 214 is a pipelined arithmetic unit for performing a larger set of arithmetic and logic functions. S-pipe 213 is a pipelined unit for performing load and store operations. Floating point unit 212 and associated floating point registers 216 are used for certain complex floating point operations which typically require multiple cycles. Like general purpose registers 217, floating point registers 216 are divided into two sets, one for each thread.

Storage control unit 221 comprises memory management unit 222, L2 cache directory 223, L2 cache interface 224, L1 data cache 107, and memory bus interface 225. L1 D-cache is an on-chip cache used for data (as opposed to instructions). L2 cache directory 223 is a directory of the contents of L2 cache 108. L2 cache interface 224 handles the transfer of data directly to and from L2 cache 108. Memory bus interface 225 handles the transfer of data across memory bus 109, which may be to main memory 102 or to L2 cache units associated with other CPUs. Memory management unit 222 is responsible for routing data accesses to the various units. E.g., when S-pipe 213 processes a load command, requiring data to be loaded to a register, memory management unit may fetch the data from L1 D-cache 107, L2 cache 108, or main memory 102. Memory management unit 222 determines where to obtain the data. L1 D-cache 107 is directly accessible, as is the L2 cache directory 223, enabling unit 222 to determine whether the data is in either L1 D-cache 107 or L2 cache 108. If the data is in neither on-chip L1 D-cache nor L2 cache 108, it is fetched from memory bus 109 using memory interface 225.

While various CPU components have been described and shown at a high level, it should be understood that the CPU of the preferred embodiment contains many other components not shown, which are not essential to an understanding of the present invention. For example, various additional special purpose registers will be required in a typical design, some of which must be replicated for each thread. It should also be understood that the number, type and arrangement of components within CPU 101 could be varied. For example, the number and configuration of buffers and caches may vary; the number and function of execution unit pipelines may vary; registers may be configured in different arrays and sets; dedicated floating point processing hardware may or may not be present; etc.

Ideally, instruction unit 201 provides a constant stream of instructions for decoding in decoder 206, and execution by execution unit 211. L1 I-cache 106 must respond to an access request with minimal delay. Where a requested instruction is actually in L1 I-cache, it must be possible to respond and fill the appropriate buffer without requiring decoder/dispatcher 206 to wait. Where L1 I-cache can not respond (i.e., the requested instruction is not in L1 I-cache), a longer path via cache fill bus 233 through memory management unit 222 must be taken. In this case, the instruction may be obtained from L2 cache 108, from main memory 102, or potentially from disk or other storage. It is also possible, where system 100 comprises multiple processors, that the instruction will be obtained from L2 cache of another processor. In all of these cases, the delay required to fetch the instruction from a remote location may cause instruction unit 201 to switch threads. I.e., the active thread becomes inactive, the previously inactive thread becomes active, and the instruction unit 201 begins processing instructions of the previously inactive thread held in thread switch buffer 204.

Figure 3:
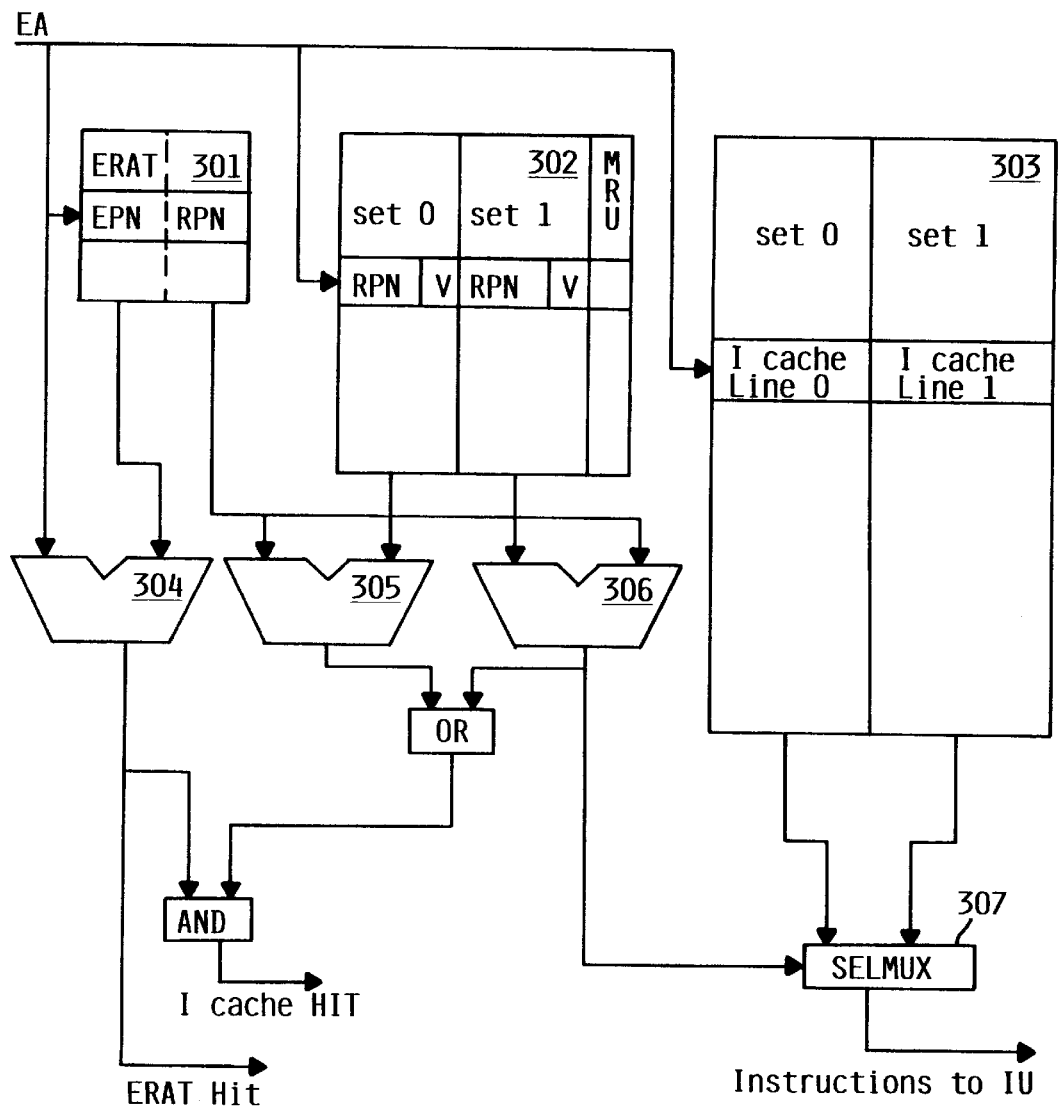
FIG. 3 illustrates the major components of an L1 instruction cache, according to the preferred embodiment.

FIG. 3 illustrates the major components of L1 I-cache 106 in greater detail than shown in FIGS. 1A, 2B or 2, according to the preferred embodiment. L1 I-cache 106 includes effective-to-real address table (ERAT) 301, I-cache directory array 302, and I-cache instruction array 303. I-cache instruction array 303 stores the actual instructions which are supplied to instruction unit 201 for execution. I-cache directory array 302 contains a collection of real page numbers, validity bits, and other information, used to manage instruction array 303, and in particular to determine whether a desired instruction is in fact in the instruction array 303. ERAT 301 contains pairs of effective page numbers and real page numbers, and is used for associating effective with real addresses.

Figure 8:
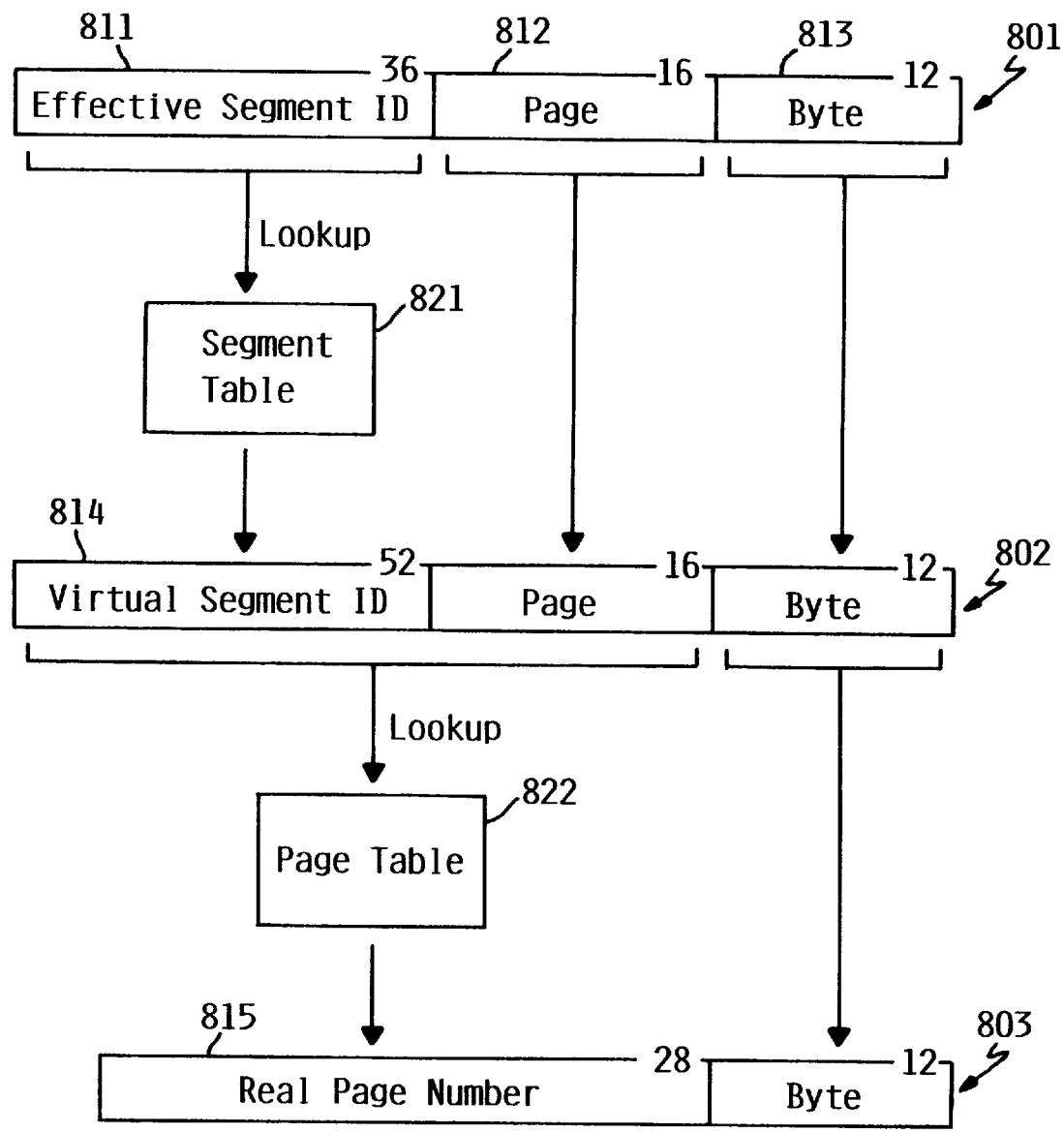
FIG. 8 is a logical illustration of address translation, according to the preferred embodiment.

CPU 101 of the preferred embodiment supports multiple levels of address translation, as logically illustrated in FIG. 8. The three basic addressing constructs are effective address 801, virtual address 802, and real address 803. An "effective address" refers to the address generated by instruction unit 201 to reference an instruction. I.e., it is the address from the point of view of the user's executable code. An effective address may be produced in any of various ways known in the art, e.g., as a concatenation of some high-order address bits in a special-purpose register (which changes infrequently, e.g., when execution of a new task is initiated) and lower order address bits from an instruction; as a computed offset from an address in a general purpose register; as an offset from the currently executing instruction; etc. In this embodiment, an effective address comprises 64 bits, numbered 0 to 63 (0 being the highest order bit). A "virtual address" is an operating system construct, used to isolate the address spaces of different users. I.e., if each user may reference the fall range of effective addresses, then the effective address spaces of different users must be mapped into a larger virtual address space to avoid conflicts. The virtual address is not a physical entity in the sense that it is stored in registers; it is a logical construction, resulting from a concatenation of a 52-bit virtual segment ID 814 and the low-order 28 bits of the effective address, a total of 80 bits. A "real address" refers to a physical location in memory 102 where the instruction is stored. The real address comprises 40 bits numbered 24 to 63 (24 being the highest order bit).

As shown in FIG. 8, an effective address 801 comprises 36-bit effective segment ID 811, 16-bit page number 812, and 12-bit byte index 813, the effective segment ID occupying the highest order bit positions. A virtual address 802 is constructed from an effective address by mapping the 36-bit effective segment ID 811 to a 52-bit virtual segment ID 814, and concatenating the resultant virtual segment ID 814 with page number 812 and byte index 813. A real address 803 is derived from the virtual address by mapping the virtual segment ID 814 and page number 812 to a 28-bit real page number 815, and concatenating the real page number with byte index 813. Because a page of main memory contains 4K (i.e., $2^{12}$) bytes, the byte index 813 (lowest order 12 address bits) specifies an address within a page, and is the same whether the address is effective, virtual or real. The higher order bits specify a page, and are therefore sometimes referred to as an "effective page number" or "real page number", as the case may be.

Computer system 100 contains an address translation mechanism for translating effective addresses generated by CPU 101 to real addresses in memory 102. This address translation mechanism includes a segment table mechanism 821 for mapping effective segment ID 811 to virtual segment ID 814, and a page table mechanism 822 for mapping virtual segment ID 814 and page number 812 to real page number 815. While these mechanisms are shown in FIG. 8 as single entities for illustrative purposes, they in fact comprise multiple tables or register at different levels. I.e., a complete page table and a complete segment table reside in main memory 102, while various smaller cached portions of the data in these tables is contained in CPU 101 itself or the L2 cache. There are additional translation mechanisms (not shown) which will in limited circumstances translate directly from an effective to a real address.

While CPU 101 supports address translation as illustrated in FIG. 8, it also supports more simple addressing. Specifically, CPU 101 of the preferred embodiment can operate in either a "tags active" or "tags inactive" mode. The different modes imply different addressing, and are used to support different operating systems. A bit in the machine state register (a special purpose register) records the current operating mode. The full addressing translation described above is used in "tags inactive" mode. In "tags active" mode, effective addresses are the same as virtual addresses (i.e., an effective segment ID 811 maps directly to virtual segment ID 814 without lookup, so that the high-order 16 bits of virtual segment ID are always 0). CPU 101 may also operate in an effective=real addressing mode (explained below).

As can be seen, address translation from an effective address to a real address requires multiple levels of table look-up. Furthermore, because portions of the address translation mechanism are located off the CPU chip and are associated with memory 102, accessing the mechanism is considerably slower than accessing on-chip cache memory. ERAT 301 may be thought of as a small cache which contains a portion of the information maintained by the address translation mechanism and directly maps effective to real addresses, and therefore in most cases permits rapid correlation of effective to real addresses within the L1 I-cache without having to access the address translation mechanism.

When instruction unit 201 requests an instruction from I-cache 106, providing an effective address of the requested instruction, I-cache must rapidly determine whether the requested instruction is in fact in the cache, return the instruction if it is, and initiate action to obtain the instruction from elsewhere (e.g., L2 cache, main memory) if it is not. In the normal case where the instruction is in fact in L1 I-cache 106, the following actions occur concurrently within the I-cache, as illustrated in FIG. 3:

(a) The effective address from instruction unit 201 is used to access an entry in ERAT 301 to derive an effective page number and associated real page number.

(b) The effective address from instruction unit 201 is used to access an entry in directory array 302 to derive a pair of real page numbers.

(c) The effective address from instruction unit 201 is used to access an entry in instruction array 303 to derive a pair of cache lines containing instructions.

In each case above, the input to any one of ERAT 310, directory array 302, or instruction array 303, is not dependent on the output of any other one of these components, so that none of the above actions need await completion of any other before beginning. The output of the ERAT 301, directory array 302, and instruction array 303 are then processed as follows:

(a) The effective page number from ERAT 301 is compared with the same address bits of the effective address from instruction unit 201 in comparator 304; if they match, there has been an ERAT "hit".

(b) The real page number from ERAT 301 is compared with each of the real page numbers from directory array 302 in comparators 305 and 306; if either of these match, and if there has been an ERAT hit, then there is an I-cache "hit", i.e., the requested instruction is in fact in I-cache 106, and specifically, in instruction array 303.

(c) The output of the comparison of real page numbers from ERAT 301 and directory array 302 is used to select (using selection multiplexer 307) which of the pair of cache lines from instruction array 303 contains the desired instruction.

Performing these actions concurrently minimizes delay where the desired instruction is actually in the I-cache. Whether or not the desired instruction is in the I-cache, some data will be presented on the I-cache output to instruction unit 201. A separate I-cache hit signal will indicate to instruction unit 201 that the output data in fact contains the desired instruction; where the I-cache hit signal absent, instruction unit 201 will ignore the output data. The actions taken by I-cache 106 in the event of a cache miss are discussed later herein.

Figure 4A:
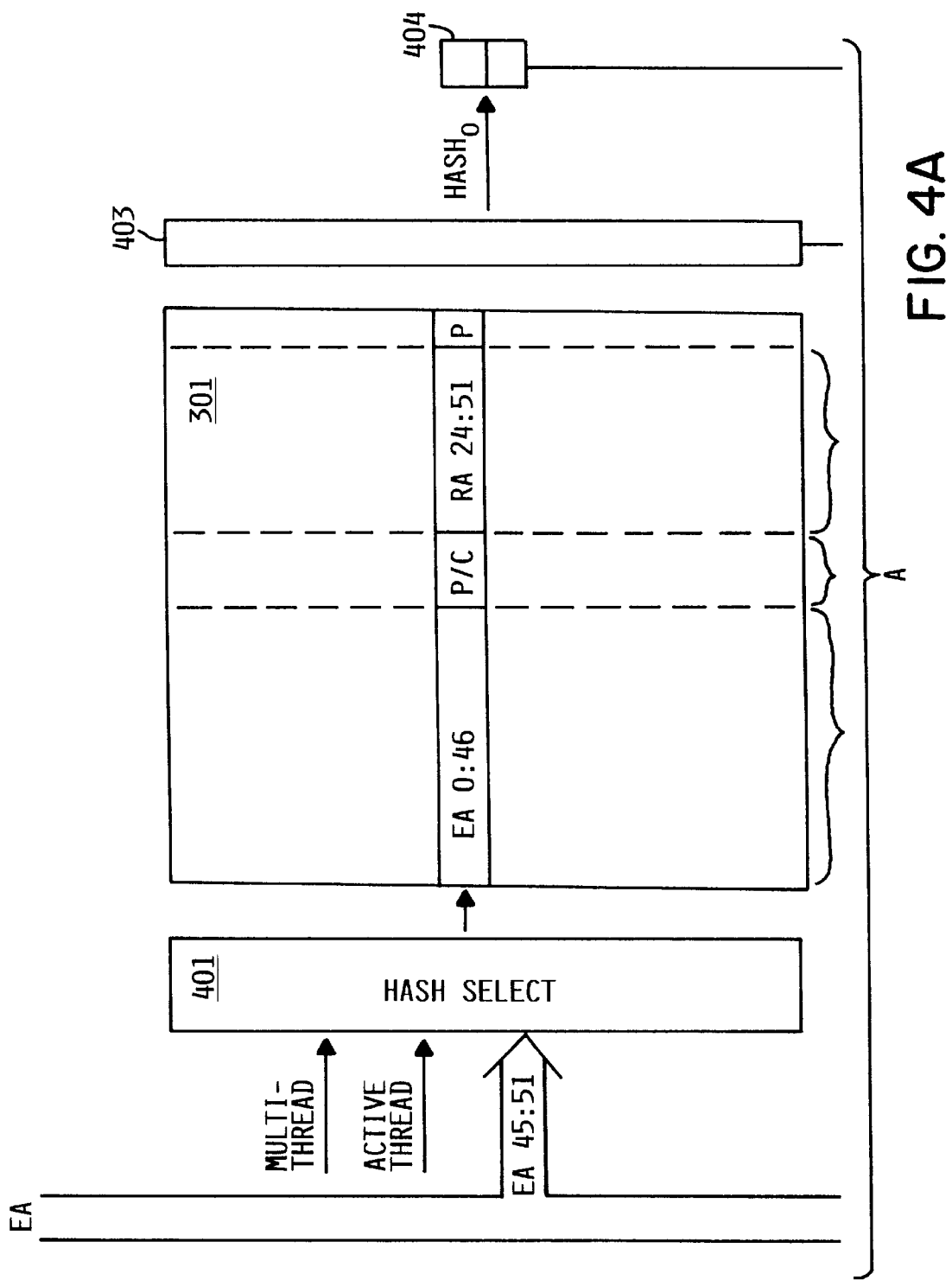
FIG. 4 illustrates in greater detail an effective to real address table and associated control structures, according to the preferred embodiment.
Figure 4B:
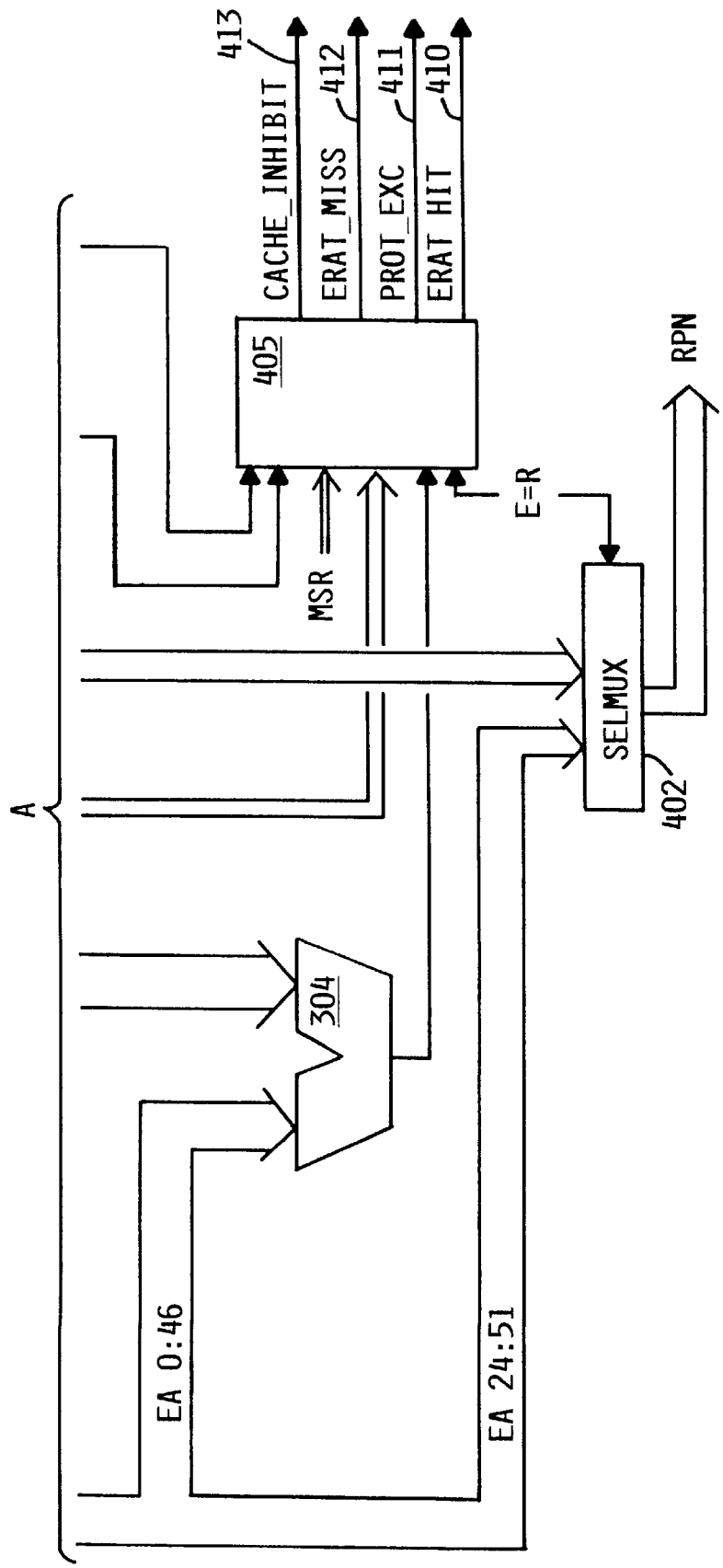

FIG. 4 shows in greater detail ERAT 301, and associated control structures. ERAT 301 is an 82-bit×128 array (i.e, contains 128 entries, each having 82 bits). Each ERAT entry contains a portion (bits 0–46) of an effective address, a portion (bits 24–51) of a real address, and several additional bits described below.

ERAT 301 is accessed by constructing a hash function of bits 45–51 of the effective address (EA), along with two control lines: multi-thread control line (MT), which indicates whether multithreading is active (in the CPU design of the preferred embodiment, it is possible to turn multithreading off); and active thread line (ActT), which indicates which of the two threads is active. The hash function (HASH) is as follows:

$HASH_{0:6} = (EA_{45}$ AND $\neg MT)$ OR $(ActT$ AND $MT) \| EA_{46} \| EA_{38}$ XOR $EA_{47} \| EA_{39}$ XOR $EA_{48} \| EA_{49:51}$ As can be seen, this is a 7-bit function, which is sufficient to specify any one of the 128 entries in the ERAT. Select logic 401 selects the appropriate ERAT entry in accordance with the above hash function.

Comparator 304 compares bits 0–46 of the effective address generated by instruction unit 201 with the effective address portion of the selected ERAT entry. Because bits 47–51 of the effective address from instruction unit 201 were used to construct the hash function, it can be shown that a match of bits 0–46 is sufficient to guarantee a match of the full effective page number portion of the address, i.e. bits 0–51. A match of these two address portions means that the real page number ($RA_{24:51}$) in the ERAT entry is in fact the real page number corresponding to the effective address page number ($EA_{0:51}$) specified by instruction unit 201. For this reason, the effective address portion stored in an ERAT entry is sometimes loosely referred to as an effective page number, although in the preferred embodiment it contains only bits 0–46 of the effective page number.

In some cases, CPU 101 will execute in a special addressing mode, known as effective=real mode (E=R). When executing in this mode, the lower order 40 bits of effective address (i.e., $EA_{24:63}$) generated by instruction unit 201 is the same as the real address ($RA_{24:63}$). Typically, this mode is reserved for certain low level operating system functions which operate more efficiently if always stored at the same real address locations. As shown in FIG. 4, when control line E=R is active, ERAT 301 is effectively bypassed. I.e., selection multiplexer 402 selects $RA_{24:51}$ from the selected ERAT entry as the real page number (RPN) output when E=R is false, and multiplexer 402 selects $EA_{24:51}$ from instruction unit 201 when E=R is true. Additionally, where E=R is true, the ERAT is deemed to be hit regardless of the comparison result in comparator 304.

Because the ERAT effectively by-passes the address translation mechanisms described above and depicted in FIG. 8, the ERAT duplicates some of the access control information contained in the normal address translation mechanism. I.e., a translation of effective address to real address will normally verify access rights through additional information contained in segment table 821, page table 822, or elsewhere. ERAT 301 caches a subset of this information to avoid the need to refer to these address translation mechanisms. Further information about the operation of the ERAT can be found in U.S. patent application Ser. No. 08/966,706, filed Nov. 10, 1997, entitled Effective-To-Real Address Cache Managing Apparatus and Method, herein incorporated by reference.

Each ERAT entry contains several parity, protection, and access control bits. In particular, each ERAT entry includes a cache inhibit bit, a problem state bit, and an access control bit. Additionally, separate array 403 (1 bit×128) contains a single valid bit associated with each respective ERAT entry. Finally, a pair of tag mode bits is stored in separate register 404. The valid bit from array 403 records whether the corresponding ERAT entry is valid; a variety of conditions might cause processor logic (not shown) to reset the valid bit, causing a subsequent access to the corresponding ERAT entry to reload the entry. The cache inhibit bit is used to inhibit writing the requested instruction to I-cache instruction array 303. I.e., although a range of addresses may contain an entry in ERAT, it may be desirable to avoid caching instructions in this address range in the I-cache. In this case, every request for an instruction in this address range will cause the line fill sequence logic (described below) to obtain the requested instruction, but the instruction will not be written to array 303 (nor will directory array 302 be updated). The problem state bit records the "problem state" of the executing thread (i.e., either supervisor or user) at the time the ERAT entry is loaded. A thread executing in supervisor state generally has greater access rights than one in problem state. If an ERAT entry were loaded during one state, and the problem state subsequently changed, there is a risk that the currently executing thread should not have access to addresses in the range of the ERAT entry, and this information must accordingly be verified when the ERAT is accessed. The access control bit also records access information at the time the ERAT entry was loaded, and is checked at the time of access. Tag mode bits 404 record the tag mode of the processor (tags active or tags inactive) when the ERAT was loaded; there is one tag mode bit associated with each half (64 entries) of the ERAT, which is selected using the 0 bit of the ERAT HASH function. Since tag mode affects how effective addresses are interpreted, a change to tag mode means that the real page numbers in the ERAT entry can not be considered reliable. It is expected that the tag mode will change infrequently, if ever. Therefore, if a change is detected, all entries in the corresponding half of the ERAT are marked invalid, and are eventually reloaded.

ERAT logic 405 generates several control signals which control the use of the RPN output of selection multiplexer 402 and ERAT maintenance, based on the output of selector 304, the effective=real mode, the various bits described above, and certain bits in the CPU's Machine State Register (not shown). In particular, logic 405 generates ERAT Hit signal 410, Protection Exception signal 411, ERAT Miss signal 412, and Cache Inhibit signal 413.

ERAT Hit signal 410 signifies that the RPN output of selection multiplexer 402 may be used as the true real page number corresponding to the requested effective address. This signal is active when effective=real (by-passing the ERAT); or when comparator 304 detects a match and there is no protection exception and certain conditions which force an ERAT miss are not present. This can be expressed logically as follows:

ERAT_Hit=(E=R) OR (Match_304 AND Valid AND ¬Protection_Exc AND ¬Force_Miss)

Where Match_304 is the signal from comparator 304 indicating that $EA:_{0:46}$ from instruction unit 201 matches $EA:_{0:46}$ in the ERAT entry, and Valid is the value of valid bit from array 403.

Protection Exception signal 411 signifies that, while the ERAT entry contains valid data, the currently executing process is not allowed to access the desired instruction. ERAT Miss signal 412 indicates that the requested ERAT entry does not contain the desired real page number, or that the entry can not be considered reliable; in either case, the ERAT entry must be reloaded. Cache inhibit signal 413 prevents the requested instruction from being cached in instruction array 303. These signals are logically derived as follows:

```
Force_Miss    = (MSR(Pr)≠ ERAT(Pr)) OR (MSR(TA)≠ Tag_404)
Protection_Exc = ¬E=R AND ¬Force_Miss AND Match_304 AND
                 Valid AND ERAT(AC) AND (MSR(Us) OR
                 ¬MSR(TA))
ERAT_Miss     = ¬E=R AND (¬Match_304 OR ¬Valid OR
                 Force_Miss)
Cache_Inhibit  = ¬E=R AND ERAT(CI)
```

Where:

ERAT(Pr) is the problem state bit from the ERAT entry;

ERAT(AC) is the access control bit from the ERAT entry;

ERAT(CI) is the cache inhibit bit from the ERAT entry;

MSR(TA) is the tags active bit from the Machine State Register;

MSR(Us) is the User state bit from the Machine State Register; and

Tag_404 is the selected tag bit from register 404.

Figure 5:
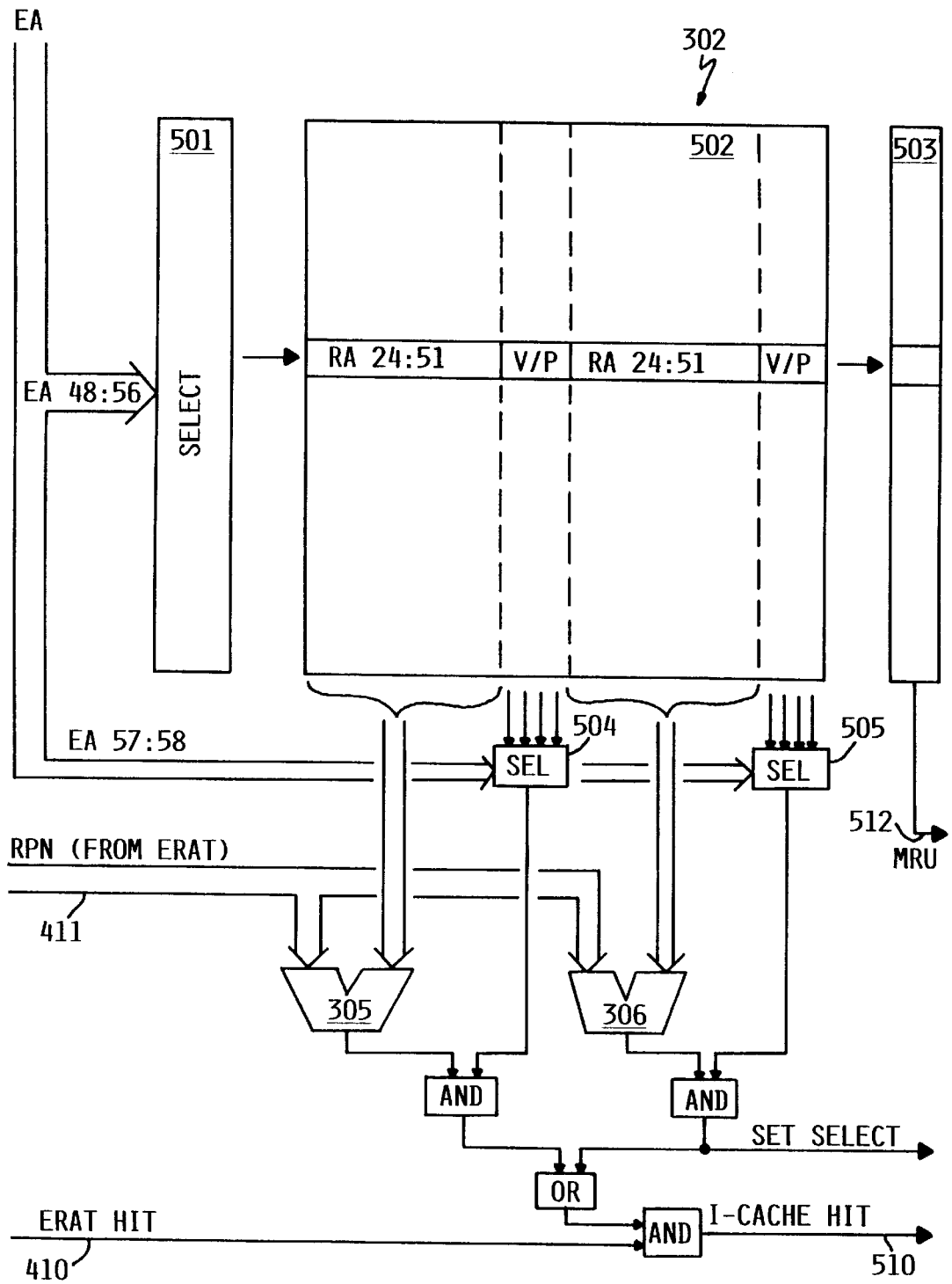
FIG. 5 illustrates in greater detail an L1 instruction cache directory array and associated control structures, according to the preferred embodiment.

FIG. 5 shows in greater detail I-cache directory array 302 and associated control structures. The I-cache directory array comprises a 66-bit×512 array 502 for holding real page numbers and certain control bits, plus an additional 1-bit× 512 array 503 for storing a most-recently-used bit. Arrays 502 and 503 are physically separate, although they could logically be treated as a single array. Array 502 is logically divisible into two sets, the first 33 bits of each array entry belonging to the first set (set 0) and the last 33 bits of each entry belonging to the second set (set 1). Each entry in array 502 comprises a 28-bit real page number (i.e., real address bits 24–51) corresponding to set 0, four validity bits for set 0, a parity bit for set 0, a 28-bit real page number for set 1, four validity bits for set 1, and a parity bit for set 1.

Figure 6:
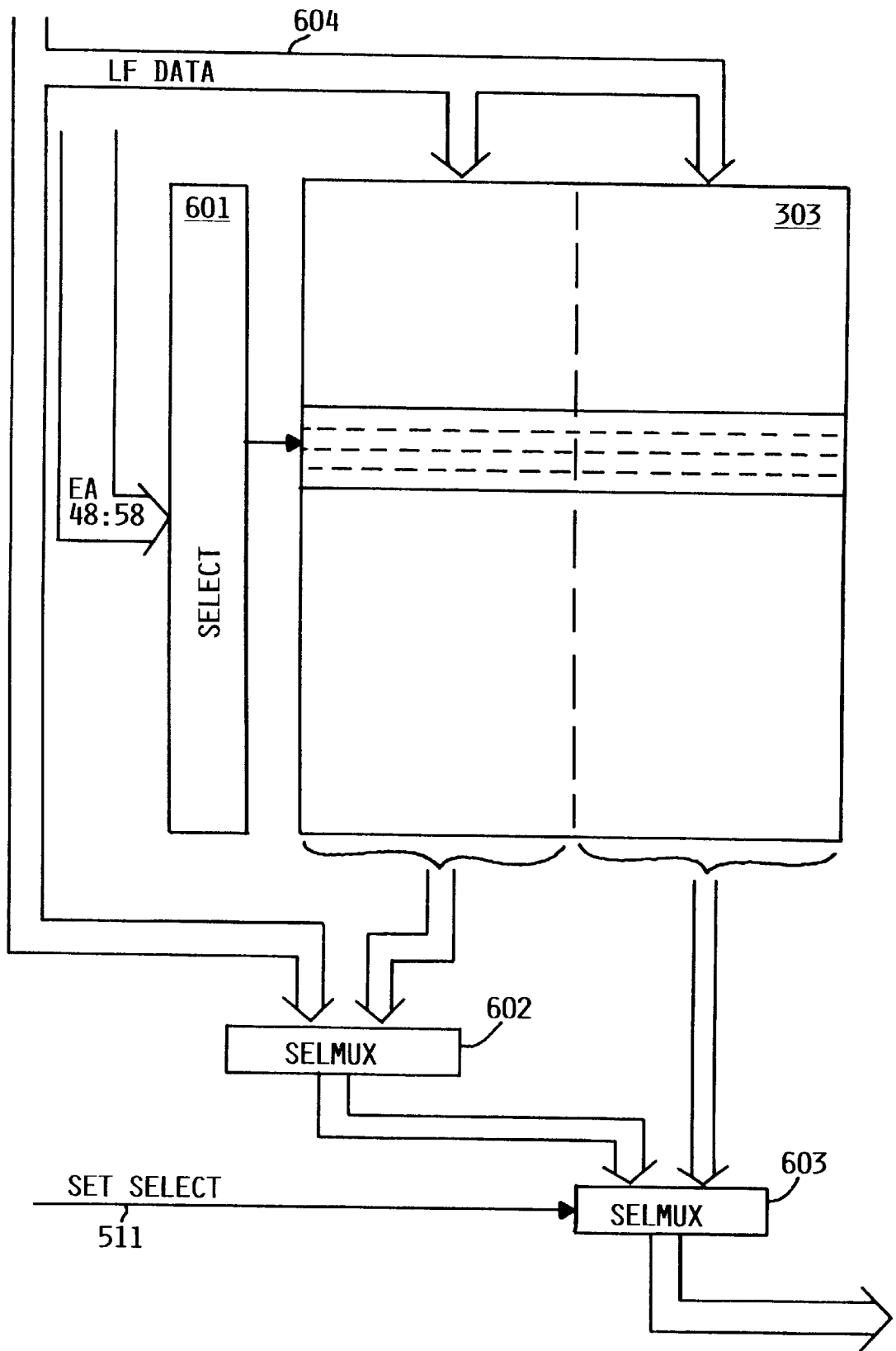
FIG. 6 illustrates in greater detail an L1 instruction cache instruction array and associated control structures, according to the preferred embodiment.

FIG. 6 shows in greater detail I-cache instruction array 303 and associated control structures. I-cache instruction array 303 comprises a 64 byte×2048 array, which, like directory array 502, is logically divisible into two sets, the first 32 bytes of each array entry belonging to set 0, and the second 32 bytes belonging to set 1. Each entry in instruction array 303 comprises 8 processor executable instructions (4 bytes each) corresponding to set 0, and 8 processor executable instructions (4 bytes each) corresponding to set 1.

Each entry in directory array 502 is associated with a contiguous group of four entries in instruction array 303.

This contiguous group of four entries contained in a single set (set 0 or set 1) is referred to as a cache line, while the single entry contained in either set is referred to as a cache sub-line. While select logic 601 is capable of independently accessing each entry (i.e., a pair of cache sub-lines, one from each set 0 and set 1), there is only one real page number in directory array 502 corresponding to each cache line, or group of four sub-lines. For this reason, four cache sub-lines constituting a cache line are filled as a group in a single cache line fill operation, as explained more fully herein.

In the preferred embodiment, a cache line in instruction array 303 contains 128 bytes, requiring 7 address bits (address bits 57–63) to designate a byte within the space of a cache line. Address bits 57 and 58 specify one of the four cache sub-lines within a cache line. The real address of a cache line is designated with real address bits 24–56.

Effective address bits 48–56 (corresponding to the low-order address bits of a cache line) are used to select an entry in arrays 502 and 503. Select logic 501 is a direct decode of these address bits. This is in effect a simple hash function. I.e., there are $2^9$ possible combinations of effective address bits 48–56, but $2^{33}$ possible real addresses for cache lines (combinations of real address bits 24–56) are mapped into this array. Similarly, effective address bits 48–58 (corresponding to the low order address bits of a cache sub-line) are used to select an entry in instruction array 303, select logic 601 being a direct decode of these address bits. The real address of a cache sub-line in instruction array 303 is the real page number ($RA_{24:51}$) of the corresponding entry and set in directory array 502 concatenated with effective address bits 52–58 ($EA_{52:58}$)

Because there are two real page numbers (from set 0 and set 1) in each entry, there are two real page numbers in the I-cache directory (and two cache lines in instruction array 303) corresponding to each 9-bit combination of effective address bits 48–56. This characteristic makes it possible to avoid I-cache contention between threads.

Because select logic 501 functions as a sparse hash function, there is no guarantee that either of the real page numbers contained in an entry in array 502 correspond to the full effective address page number of the desired instruction. In order to verify correspondence, both selected real page numbers are simultaneously compared with the real page number output 411 of ERAT 301, using comparators 305 and 306. Concurrently with this comparison, effective address bits 57–58 are used to select an appropriate one of the four validity bits in set 0 (selector 504) and one of the four validity bits in set 1 (selector 505) from the selected entry in array 502. The selected validity bits correspond to the cache sub-lines of the desired instruction. These are ANDed with the output of the respective corresponding comparator 305, 306 to produce a pair of signals indicating a match of the respective set. The logical OR of these signals is ANDed with ERAT hit signal 410 to product I-cache hit signal 510, which indicates that the desired instruction is indeed in the L1 I-cache.

As explained above, select logic 601 uses the effective address of a desired instruction provided by the instruction unit to access an entry (a pair of "sub-lines") in instruction array 303. Selector 602 selects either the sub-line from set 0 of array 303 or a by-pass sub-line value from cache write bus 604. The by-pass sub-line value is used when a cache line is being filled following a cache miss; in this case, the new cache sub-line value is presented on cache write bus 604 as soon as it is available from an external source, without first being written to instruction array 303. A small amount of time is saved by thus by-passing the instruction array during a cache fill operation. The by-pass is also used when cache-inhibit line 413 is active.

Selector 603 selects either the output of selector 602 or the subline from set 1 of array 303, depending on the value of set select line 511. Set select line 511 is high if there was a cache hit for the set 1 half of the cache. I.e., where comparator 306 detects a match between the real page number 411 from ERAT and the set 1 real page number from the selected entry in directory array 502; and the corresponding sub-line validity bit selected by selector 505 is valid, set select line 511 will be high, causing selector 603 to select the sub-line from set 1 of array 303. In all other cases (including cache misses), the output of selector 602 is selected. The output of selector 603 is 32 bytes of data from contiguous memory locations representing 8 instructions. This is presented to instruction unit 201, for writing to one or sequential buffer 203, thread buffer 204, or branch buffer 205. In the event that there has been a cache miss, I-cache hit line 510 will be low, and the output of selector 603 will be ignored (i.e., it will not be written to one of the buffers in instruction unit 201). If there is a cache hit (line 510 active), the MRU bit in array 503 corresponding to the selected directory entry is updated with the value of the set select line 511.

The above text describes the situation where the instruction sought is actually in the I-cache. Where there has been an I-cache miss, there are two possibilities: (a) there has been an ERAT hit, but the instruction is not in the instruction array; or (b) there has been an ERAT miss. In the case where there has been an ERAT hit, it is possible to fill the desired cache line significantly faster. Because the real page number is in the ERAT, the desired data is known to be in main memory (and possibly in an L2 cache). It is possible for logic in L1 I-cache 106 to construct the full real address of the desired instruction from ERAT data, without accessing external address translation mechanisms, and to fetch this data directly from L2 cache or memory.. In the case where there has been an ERAT miss, an external address translation mechanism must be accessed in order to construct the real address of the desired instruction, and to update the ERAT as necessary with the new real page number. It is possible that in this case, the desired data will not exist in main memory at all, and will have to be read in from secondary storage such as a disk drive. While it is theoretically possible to have an ERAT miss when the desired instruction is actually in instruction array 303, this is deemed a rare occurrence. Accordingly, whenever there has been an ERAT miss, a line fill of the instruction array is initiated at the same time.

Figure 7A:
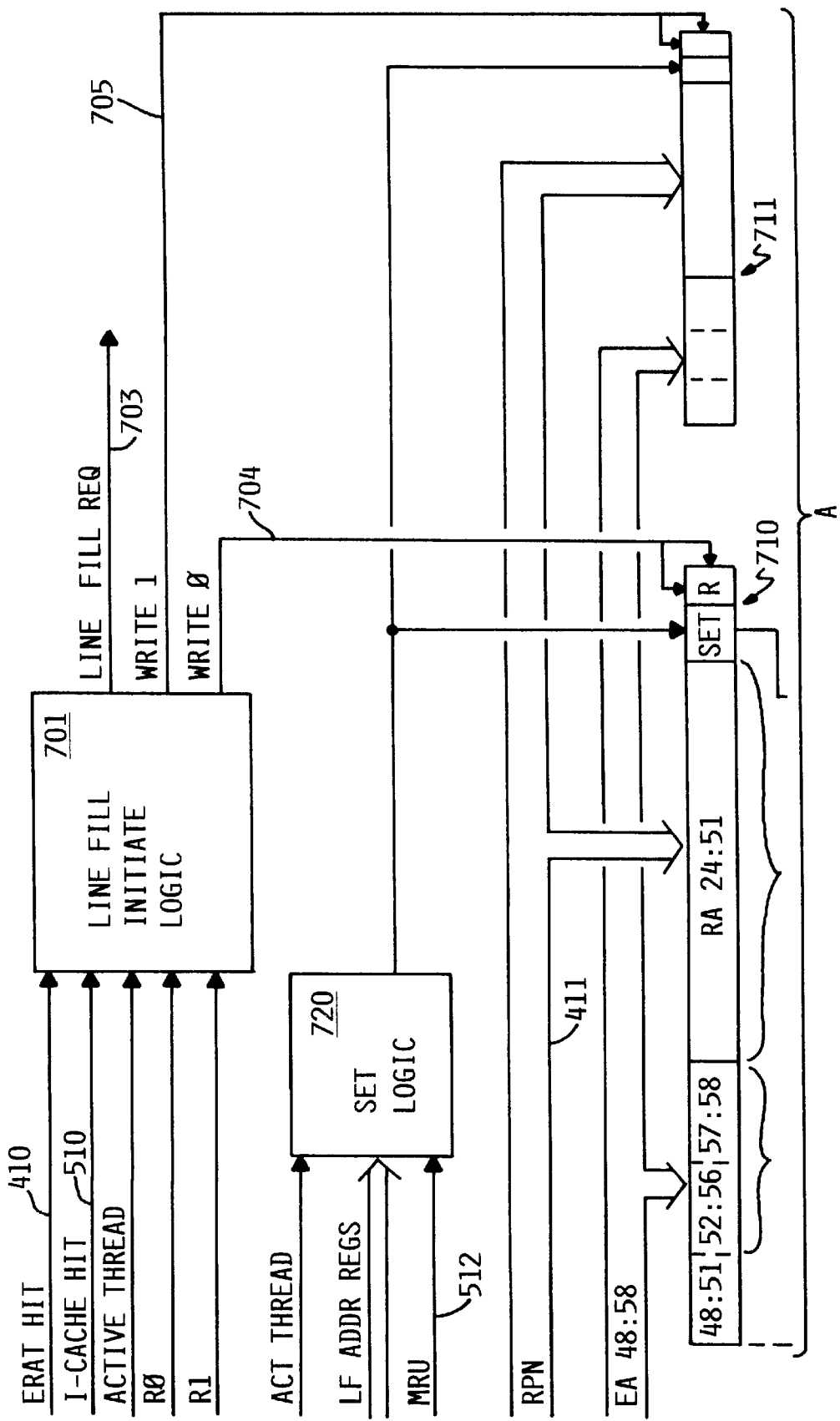
FIG. 7 illustrates the major control logic which generates a cache line fill, according to the preferred embodiment.
Figure 7B:
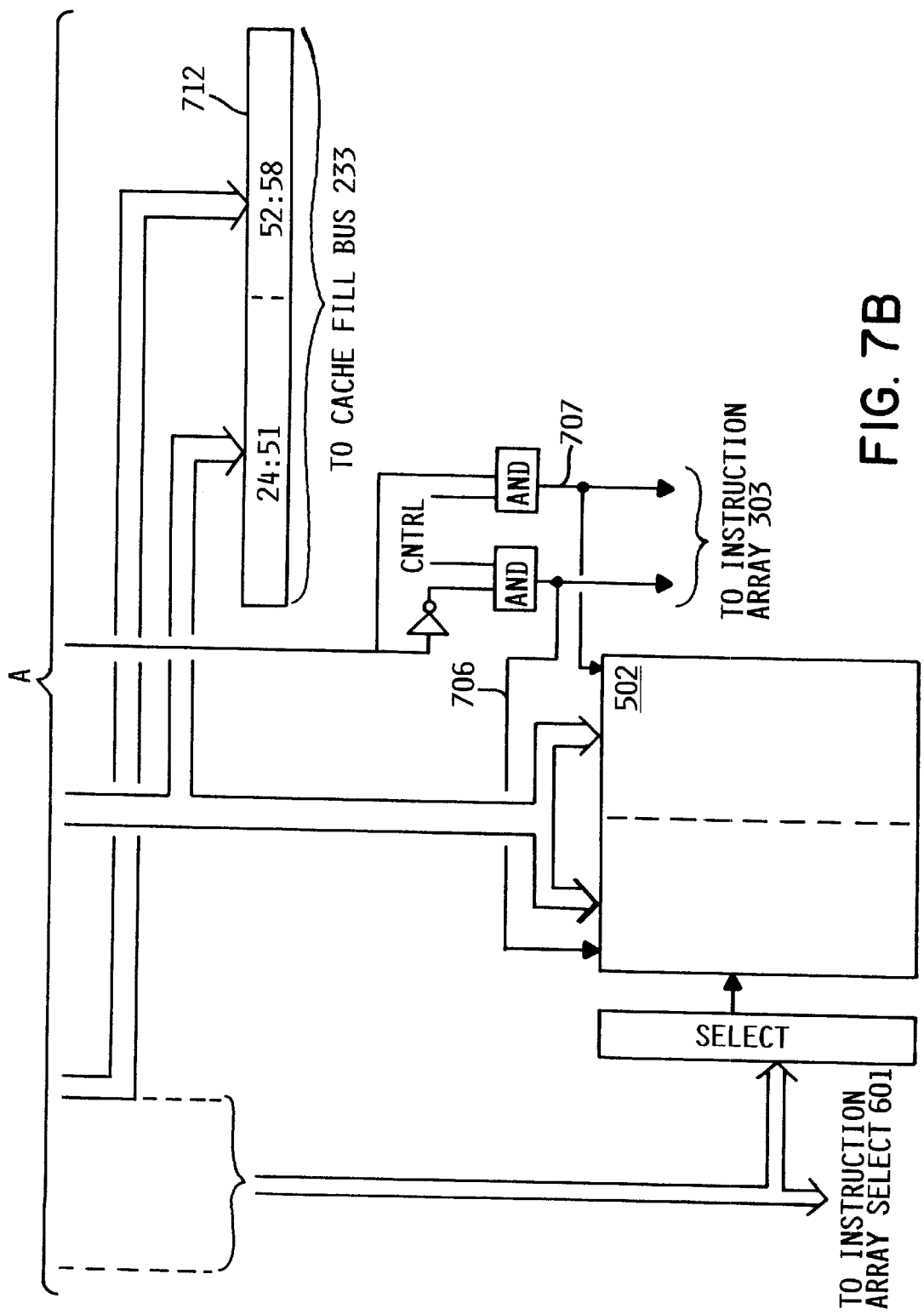

FIG. 7 illustrates the major fast line fill sequencer logic, i.e., control logic which generates a cache line fill in the event of a cache miss, where there has been an ERAT hit. Fast line fill sequencer logic includes line fill initiate logic 701 and a pair of registers 710, 711 (designated LFAddr0 and LFAddr1), which store line fill request parameters pending completion of the line fill operation.

Each LFAddr register 710, 711 corresponds to one of the two threads, i.e., LFAddr0 710 corresponds to thread 0, and LFAddr1 711 corresponds to thread 1. If instruction unit 201 makes a request for an instruction while executing thread 0, the request parameters are stored in LFAddr0 register 710, and similarly a request while executing thread 1 is stored in LFAddr1 register 711. (In the event multithreading is turned off, only LFAddr0 register 710 is used.) Each LFAddr register 710, 711 can store only a single line fill request. Therefore, in the event that there is an ERAT hit and I-cache miss for a given thread while there is an outstanding line fill request pending for the same thread, the second request must be delayed.

Each LFAddr register contains effective address bits 48–58 ($EA_{48:58}$), real address bits 24–51 ($RA_{24:51}$), a set bit and a request outstanding ("R") bit. The address bits are used both to generate a real address in memory of the cache line to be filled, and to write to directory array 502 and instruction array 303 when the cache line is returned. Set bit determines which set (set 0 or set 1) of directory array 502 and instruction array 303 will be written to. Request outstanding ("R") bit is set to 1 when an outstanding request is put in the LFAddr register, and reset when the line fill request is completed (reset logic not shown).

Line fill initiate logic 701 receives as input ERAT hit line 410, I-cache hit line 510, Active Thread control line (ActT) specifying which thread is active, and the request outstanding bits from LFAddr0 register 710 and LFAddr1 register 711 (designated "R0" and "R1", respectively). A line fill request is initiated (line fill req line 703 is activated) whenever there is an ERAT hit, an I-cache miss, and there is no currently pending line fill request in the LFAddr register corresponding to the currently active thread. If there is an ERAT hit and I-cache miss, but there is also a pending line fill request in the LFAddr register corresponding to the currently active thread, the I-cache will wait until the pending line fill request completes (resetting the "R"bit), and then initiate a new line fill request. The logical relationships between these inputs and output can be expressed as follows:

---
LFReq = ERATHit AND ¬ICacheHit AND
    [(¬ActT AND ¬R0) OR (ActT AND ¬R1)]
---

When the line fill request is initiated, line fill initiate logic generates write signals 704, 705, to cause request parameters to be written to one of LF Addr registers 710, 711. Only one of write signals 704, 705 can ever be active at any time. If one of write signals 704, 705 becomes active, $EA_{48:58}$ (from L1 I-cache address bus 231), $RA_{24:51}$ (path 411, from ERAT 301), and a set bit from set logic 720 are stored in the LFAddr register corresponding to the currently active thread. At the same time, the request outstanding bit in the register is set to 1. The logical derivation of the write signals is as follows:

---
Write0 = ERAT_Hit AND ¬ICacheHit AND ¬ActT AND ¬R0
Write1 = ERAT_Hit AND ¬ICacheHit AND ActT AND ¬R1
---

Since directory array 502 and instruction array 303 are divided into two sets (set 0 and set 1), each indexed by the same hash function, the cache line from a line fill request can logically be written to either set. The set to which the cache line will be written is determined by set logic 720 at the time the line fill request is made, and stored in the set bit of the appropriate LFAddr register. Generally, the set selected is the least recently used set of the cache line to be filled, i.e., set is the inverse of the MRU bit corresponding to the entry in directory array 502 indexed by the hash function. However, in the special case where there is an outstanding line fill request for the inactive thread, and this outstanding line fill will fill the same cache line, then the set selected is the set opposite that selected for the outstanding line fill request for the inactive thread. By thus fixing the set at the time the line fill request is initiated, a potential live-lock situation is avoided (i.e., two outstanding line fill requests attempting to write to the same set).

The use of information stored in register 710 is shown in FIG. 7. For clarity of illustration, similar data paths from register 711 are omitted from the drawing. The address of the cache sub-line containing the requested instruction is derived from some of the address information stored in the applicable LRAddr register. Specifically, the real page number ($RA_{24:51}$) is concatenated with bits $EA_{52:58}$ to obtain the real address of the cache sub-line. This is represented as feature 712 in FIG. 7. This is not necessarily a separate register, but merely a representation of the assembly of the address from appropriate bits of one of the LFAddr registers. Line fill request line 703 initiates a request for data to memory management unit 222, transmitting the address represented as 712 on cache fill bus 233. A thread tag bit is also transmitted, enabling the L1 I-cache control logic to later determine which LFAddr register is associated with returned instructions. Memory management unit then makes the determination whether to obtain the requested instruction from L2 cache 108, main memory 102, or some other source. When the requested instruction is available to memory management unit 222, it is transmitted to L1 I-cache on bus 233, along with the thread tag bit..

The return of a requested instruction on bus 233 will generate control signals causing data to be written to directory array 502 and instruction array 303. Specifically, $EA_{48:56}$ from the appropriate LFAddr register 710, 711 is used to select an entry in array 502. The set bit from the LFAddr register is used in conjunction with control signals to generate a write signal to one-half of array 502 on one of write signal lines 706, 707, the state of the set bit determining which half of array 502 is written to (i.e., which of write signal lines 706 or 707 is active). The real page number ($RA_{24:51}$) from the LFAddr register is written to array 502, at the entry selected by $EA_{48:51}$, in the array half determined by the set bit. The MRU bit for the directory array is updated at the same time.

Concurrently with the above operation, $EA_{48:56}$ from the LFAddr register is used to select an entry in instruction array 303, and the set bit from the LFAddr register is similarly used to generate a write signal for one half of the array. The data written to this location is the data (series of instructions) from bus 233, which is presented on LF data bus 604 as shown in FIG. 6. In the case of filling instruction array 303, however, only one sub-line at a time can be written. LF data bus 604 presents one sub-line (32 bytes) at a time. The complete sub-line is selected by select logic 601, using $EA_{48:56}$ from the LFAddr register, and two additional address bits, 57 and 58, provided by sequence logic (not shown). Four write cycles are thus necessary to fill an entire cache line.

When the real page number of the updated instruction array entry is written to directory array 502, the four validity bits (one for each sub-line) are initially set to invalid. As each successive sub-line is written to instruction array 303, the corresponding validity bit in directory array 502 is updated to reflect that the data is now valid. If the writing of the cache line in successive write cycles as described above should be interrupted for any reason, directory array 502 will contain correct information.

In the event of an ERAT miss, the real page number output of selector 402 is unreliable. Before anything else can be done, it is necessary to translate the page number portion of the effective address from instruction unit 201 to a real page number. ERAT_Miss line 412 will trigger the address translation mechanism depicted logically in FIG. 8. The actual hardware which performs this translation is not part of I-cache 106; some of the hardware may be contained in CPU

201, while other hardware may be in main memory 102 or elsewhere. This address translation will typically require a relatively large number of cycles compared to the line fill operation described above. When a translated real page number is returned following an ERAT miss, the real page number is concurrently used to update ERAT 301, and written to the appropriate LFAddr register (710 or 711) to initiate a line fill operation. While it is theoretically possible in this case that the requested instruction will be in the cache already notwithstanding the ERAT miss, this is deemed a sufficiently rare event that performance is improved by immediately requesting the line fill operation, rather than waiting to fill the ERAT entry.

It will be understood that certain logic circuitry not essential to an understanding of the present invention has been omitted from the drawings and description herein for clarity. For example, logic for maintaining the MRU bit in array 502, logic for detecting parity errors and taking appropriate corrective action, etc., have been omitted.

In the preferred embodiment, an ERAT is used to provide a portion of a real address (real page number), for comparison with the real page number in the directory array, in order to verify a cache hit. This design is preferred because the ERAT provides a rapid translation to a real page number, which is independent of the response time of the main address translation mechanism. This frees the system designer from certain constraints, since the main address translation mechanism is not required to translate addresses with the rapidity necessary to support single-cycle response time in the I-cache. However, in alternative embodiments, it would be possible to construct an instruction cache as described herein without an ERAT. In this case, the main address translation mechanism could be used to supply a real page number for comparison with the real page number in the directory array. In a further alternative embodiment, it may be possible to provide a real page number using some other mechanism either internal or external to the L1 I-cache.

In the preferred embodiment, the cache associativity number is the same as the number of threads. This helps avoid thread contention for a common cache. However, it is alternatively possible to design a cache as described herein in which the number of threads is not the same as the cache associativity. For example, if the number of threads supported by the processor is larger, a cache associativity as high as the number of threads may be unnecessary to avoid contention. In this case, even though contention is a theoretical possibility with an associativity of less than the number of threads, it may be a rare enough occurrence that a lesser cache associativity is acceptable. It may even be tolerable to have a cache associativity of 1, although there will likely be some contention.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A multithreaded computer processing apparatus, comprising:

a plurality of sets of registers for supporting the execution of a plurality of threads, each set of registers corresponding to a respective one of said plurality of threads;

an instruction unit, said instruction unit comprising decode logic for decoding instructions and sequence logic for generating effective addresses of instructions to be executed; and an instruction cache, said instruction cache providing an instruction responsive to a desired effective address generated by said instruction unit, said instruction cache comprising:

(a) a directory array having a plurality of entries, each entry containing a portion of a real address of an instruction, wherein an entry in said directory array is selected using said desired effective address;

(b) an instruction array having a plurality of entries, each instruction array entry being associated with an entry in said directory array and comprising at least one instruction, wherein an entry in said instruction array is selected using said desired effective address; and (c) a plurality of line fill registers, each of said line fill registers corresponding to a respective one of said plurality of threads, each line fill register storing at least a portion of a respective real address of a desired instruction to be retrieved in response to an instruction cache miss.

2. The multithreaded computer processing apparatus of claim 1, said instruction cache further comprising:

(d) an effective-to-real address translation array having a plurality of entries, each entry containing a portion of an effective address and a portion of a real address, wherein an entry in said effective-to-real address translation array is selected using said desired effective address;

wherein said portion of a respective real address of a desired instruction stored in said line fill registers is obtained from an entry in said effective-to-real address translation array.

3. The multithreaded computer processing apparatus of claim 2, said instruction cache further comprising:

(e) a comparator for comparing said portion of an effective address from an entry in said effective-to-real address translation array with a corresponding portion of said desired effective address to determine an effective-to-real address translation array hit.

4. The multithreaded computer processing apparatus of claim 1, wherein:

said directory array is divided into N sets, where N>1, each said directory array entry containing a respective portion of a plurality of real addresses of instructions, each real address portion belonging to a respective set of said N sets of said directory array; and said instruction array is divided into N sets, each set of said instruction array corresponding to a respective set of said directory array, each said instruction array entry containing a plurality of instructions, each instruction belonging to a respective set of said N sets of said instruction array.

5. The multithreaded computer processing apparatus of claim 4, wherein said multithreaded computer processing apparatus supports the execution of N threads.

6. The multithreaded computer processing apparatus of claim 4, wherein each of said line fill registers comprises a set field, said set field specifying which of said N sets the desired instruction to be retrieved will be stored upon retrieval.

7. The multithreaded computer processing apparatus of claim 4, said instruction cache further comprising:

(d) N comparators, each comparator being associated with a respective set of said directory array, each comparator for comparing said respective portion of a real address of an instruction from the associated portion of a selected entry in said directory array with a common portion of a real address associated with said desired effective address to determine a cache hit.

8. The multithreaded computer processing apparatus of claim 4, said instruction cache further comprising:

(d) an effective-to-real address translation array having a plurality of entries, each entry containing a portion of an effective address and a portion of a real address, wherein an entry in said effective-to-real address translation array is selected using said desired effective address;

wherein said portion of a respective real address of a desired instruction stored in said line fill registers is obtained from an entry in said effective-to-real address translation array.

9. The multithreaded computer processing apparatus of claim 8, said instruction cache further comprising:

(e) N comparators, each comparator being associated with a respective set of said directory array, each comparator for comparing said respective portion of a real address of an instruction from the associated portion of a selected entry in said directory array with a common portion of a real address associated with said desired effective address to determine a cache hit, wherein said common portion of a real address associated with said desired effective address compared by said comparators to determine a cache hit is obtained from an entry in said effective-to-real address translation array.

10. A computer system supporting hardware multithreading, comprising:

a multithreaded central processing unit;

a main memory for storing data, including instructions executable on said multithreaded central processing unit;

a plurality of I/O devices; and at least one bus supporting transfer of data between components of said computer system;

wherein said multithreaded central processing unit comprises:

a plurality of sets of registers for supporting the execution of a plurality of threads, each set of registers corresponding to a respective one of said plurality of threads;

an instruction unit, said instruction unit comprising decode logic for decoding instructions and sequence logic for generating effective addresses of instructions to be executed; and an instruction cache, said instruction cache providing an instruction responsive to a desired effective address generated by said instruction unit, said instruction cache comprising:

(a) a directory array having a plurality of entries, each entry containing a portion of a real address of an instruction, wherein an entry in said directory array is selected using said desired effective address;

(b) an instruction array having a plurality of entries, each instruction array entry being associated with an entry in said directory array and comprising at least one instruction, wherein an entry in said instruction array is selected using said desired effective address; and (c) a plurality of line fill registers, each of said line fill registers corresponding to a respective one of said plurality of threads, each line fill register storing at least a portion of a respective real address of a desired instruction to be retrieved in response to an instruction cache miss.

11. The computer system of claim 10, wherein said computer system comprises a plurality of said multithreaded central processing units.

12. The computer system of claim 10, further comprising a level two (L2) cache, said L2 cache storing instructions for execution on said multithreaded central processing unit, wherein, in the event of an instruction cache miss in said instruction cache, an instruction may be retrieved from said L2 cache.

13. The computer system of claim 10, wherein said instruction cache of said multithreaded central processing unit further comprises:

(d) an effective-to-real address translation array having a plurality of entries, each entry containing a portion of an effective address and a portion of a real address, wherein an entry in said effective-to-real address translation array is selected using said desired effective address;

wherein said portion of a respective real address of a desired instruction stored in said line fill registers is obtained from an entry in said effective-to-real address translation array.

14. The computer system of claim 13, wherein said instruction cache of said multithreaded central processing unit further comprises:

(e) a comparator for comparing said portion of an effective address from an entry in said effective-to-real address translation array with a corresponding portion of said desired effective address to determine an effective-to-real address translation array hit.

15. The computer system of claim 13, wherein:

said directory array is divided into N sets, where N>1, each said directory array entry containing a respective portion of a plurality of real addresses of instructions, each real address portion belonging to a respective set of said N sets of said directory array; and said instruction array is divided into N sets, each set of said instruction array corresponding to a respective set of said directory array, each said instruction array entry containing a plurality of instructions, each instruction belonging to a respective set of said N sets of said instruction array.

16. The computer system of claim 15, wherein said multithreaded central processing unit supports the execution of N threads.

17. The computer system of claim 15, wherein each of said line fill registers comprises a set field, said set field specifying in which of said N sets the desired instruction to be retrieved will be stored upon retrieval.

18. The computer system of claim 15, wherein said instruction cache of said multithreaded central processing unit further comprises:

(d) N comparators, each comparator being associated with a respective set of said directory array, each comparator for comparing said respective portion of a real address of an instruction from the associated portion of a selected entry in said directory array with a common portion of a real address associated with said desired effective address to determine a cache hit.

19. The computer system of claim 15, wherein said instruction cache of said multithreaded central processing unit further comprises:

(d) an effective-to-real address translation array having a plurality of entries, each entry containing a portion of an effective address and a portion of a real address, wherein an entry in said effective-to-real address translation array is selected using said desired effective address;

wherein said portion of a respective real address of a desired instruction stored in said line fill registers is obtained from an entry in said effective-to-real address translation array.

20. The computer system of claim 19, wherein said instruction cache of said multithreaded central processing unit further comprises:

(e) N comparators, each comparator being associated with a respective set of said directory array, each comparator for comparing said respective portion of a real address of an instruction from the associated portion of a selected entry in said directory array with a common portion of a real address associated with said desired effective address to determine a cache hit, wherein said common portion of a real address associated with said desired effective address compared by said comparators to determine a cache hit is obtained from an entry in said effective-to-real address translation array.

* * * * *